US008225161B2

(12) United States Patent
Chernyshev et al.

(10) Patent No.: US 8,225,161 B2
(45) Date of Patent: Jul. 17, 2012

(54) RETRANSMISSIONS OF DATA USING INCREASED DATA RATE

(75) Inventors: Vladislav Alekseevich Chernyshev, St. Petersburg (RU); Andrey Vladimirovich Belogolovy, Saint Petersburg (RU); Evguenii Avramovich Krouk, Saint Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1418 days.

(21) Appl. No.: 11/794,063

(22) PCT Filed: Dec. 29, 2004

(86) PCT No.: PCT/RU2004/000530
§ 371 (c)(1),
(2), (4) Date: Jun. 22, 2007

(87) PCT Pub. No.: WO2006/075928
PCT Pub. Date: Jul. 20, 2006

(65) Prior Publication Data
US 2008/0010577 A1    Jan. 10, 2008

(51) Int. Cl.
*H04L 1/00* (2006.01)
(52) U.S. Cl. .................... 714/748; 714/744; 714/801
(58) Field of Classification Search .............. 714/748, 714/744, 801, 751, 776
See application file for complete search history.

(56) References Cited

U.S. PATENT DOCUMENTS

| 4,032,762 | A | * | 6/1977 | Caloyannides | ............... 708/322 |
| 4,748,625 | A | | 5/1988 | Krause et al. | |
| 5,627,970 | A | * | 5/1997 | Keshav | ......................... 709/233 |
| 5,983,382 | A | * | 11/1999 | Pauls | ............................ 714/744 |
| 6,507,199 | B1 | | 1/2003 | Ahrndt et al. | |
| 6,625,264 | B1 | | 9/2003 | Ahrndt | |
| 6,628,762 | B1 | | 9/2003 | Ahrndt et al. | |
| 6,925,157 | B1 | | 8/2005 | Ahrndt et al. | |
| 7,050,842 | B2 | * | 5/2006 | Chaiken et al. | ............... 600/316 |
| 7,289,574 | B2 | * | 10/2007 | Parolari | ........................ 375/295 |
| 7,684,496 | B2 | * | 3/2010 | Dounaev et al. | .............. 375/242 |
| 7,839,940 | B2 | * | 11/2010 | Borran et al. | ................. 375/260 |
| 2003/0206561 | A1 | | 11/2003 | Schmidl et al. | |

FOREIGN PATENT DOCUMENTS

DE        10001153        7/2001
(Continued)

OTHER PUBLICATIONS

"IEEE 802.3 10GBASE-T Study Group T Study Group Objectives", Available from http://grouper.ieee.org/groups/802/3/10GBT/public/sep03/objectives_1_0903.pdf,(Sep. 2003), 3 pages.

(Continued)

*Primary Examiner* — Fritz Alphonse
(74) *Attorney, Agent, or Firm* — Schwegman, Lundberg & Woessner, P.C.

(57) ABSTRACT

A method and apparatus are provided for error correction of a communication signal. To allow for retransmission of information in response to error determination with respect to a transmission of the information, the operating sampling rate for a communication channel is increased over its normal sampling rate. At the increased operating rate, retransmissions may be made while at least maintaining the overall data rate of the communication channel with respect to its normal sampling rate. The retransmissions may be conducted using automatic repeat request (ARQ) techniques. In an embodiment, operating at increased sampling rate allows for a decrease in the required signal-to-noise ratio at a given bit error rate for the communication channel.

39 Claims, 4 Drawing Sheets

FOREIGN PATENT DOCUMENTS

| EP | 1211838 A1 | 6/2002 |
| WO | WO-2006075928 A1 | 7/2006 |

OTHER PUBLICATIONS

Gidlund, M., "An approach for using adaptive error control schemes in wireless LAN with CSMA/CA MAC protocol", *IEEE 55th Vehicular Technology Conference, 2002. VTC Spring*, vol. 1. (May 6, 2002),224-228.

Rao, Sailesh, et al., "The 4D-PAM8 Proposal for 10GBASE-T", Available from http://grouper.ieee.org/groups/802/3/10GBT/public/nov03/rao_1_1103.pdf,1-21.

* cited by examiner

RETRANSMISSIONS OF DATA USING INCREASED DATA RATE

RELATED APPLICATIONS

This application is a U.S. National Stage Filing under 35 U.S.C. 371 from International Patent Application Serial No. PCT/RU2004/000530, filed Dec. 29, 2004, and published on Jul. 20, 2006 as WO 2006/075928 A1, which is incorporated herein by reference.

TECHNICAL FIELD

Embodiments of the invention relate generally to error correcting of communication signals.

BACKGROUND

A communication network typically includes equipment from various vendors sending data and information among the equipment in the network. To promote interoperability among vendor equipment, an open systems interconnection (OSI) reference model is a widely accepted structure to provide a standard architecture for such interoperability. Models similar to an OSI reference model may include a physical layer at the lowest structure layer followed by a data link layer. Above the data link layer, the model may include higher order layers such as a network layer, a transport layer, a session layer, a presentation layer, and an application layer. The layers may also include sub-layers.

The physical layer deals with the transmission of bit streams over a physical medium. It also deals with the mechanical, electrical, functional, and procedural characteristics to access the physical medium. The data link layer deals with the reliable transfer of information across the physical layer. It also sends blocks or frames for synchronization, error control, and flow control. The data link layer may include a medium access control (MAC) layer and a logical link control layer (LLC). Functions of the MAC layer, or sub-layer, may include assembling data into a frame with address and error-detection fields for transmission, disassembling frames and performing address identification and error detection on reception, and controlling access to the physical layer. The LLC layer may include functions such as interfacing to higher layers and performing flow and error control.

In addition to dealing with the interfacing of various vendor equipment, communication networks, for example computer networks, must deal with errors during data transmission in the communication channels of the network. A communication channel, whether it is a fiber optic channel, a co-axial channel, a wire channel, a wireless channel, or a bus connecting locations in a system over which large amounts of data are transferred, can add noise and errors to information being transmitted over the channel. Various techniques may be used to deal with errors in data transmission, such as correcting the errors on decoding or requesting retransmission of the information. In high speed data communication what is needed is a reliable scheme that provides information with as few errors as possible, but at the same time can be implemented without a significant amount of complexity.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

Standards such as the IEEE 802.3 set of standards have used the MAC sub-layer to resolve collisions occurring under concurrent media access. In addition, ten gigabit (10 G) Ethernet is designed to be used only in full duplex transmission, but not in half-duplex. In full duplex mode there are no collisions, so a function of the MAC sub-layer is to control data integrity via calculation and checking frame cyclic redundancy check (CRC) value, such as CRC32 value. If a frame checksum is not correct, the received frame is dropped and the MAC client reports that the error occurred, but no retransmission attempts are taken on the MAC level. Retransmission of a bad or dropped frame is initiated only two layers higher, on a transport layer such as TCP/IP, etc.

The retransmission of erroneous packets causes the overall data rate to be lower then projected. In an embodiment, the data rate is maintained at a desirable value when using coded pulse amplitude modulation (PAM) by increasing the sampling frequency. Such an increased operating rate allows the transmission of more samples per time unit and also increases the data rate in the communication channel. Then, the MAC in a 10 G Ethernet network may handle additional activity such as retransmission of erroneous packets. Alternatively, the code used in modulation for transmission in the communication channel may be replaced by a code with a higher rate, while maintaining the sampling frequency of the communication channel. This would decrease overall redundancy and increase data rate. A hybrid embodiment includes using a first error correcting code to correct errors and, if the error correcting code fails, a request to retransmit the packet is made. Various embodiments may be implemented in future 10 G Ethernet data link layers and other communication networks with similar properties.

Figure 1:
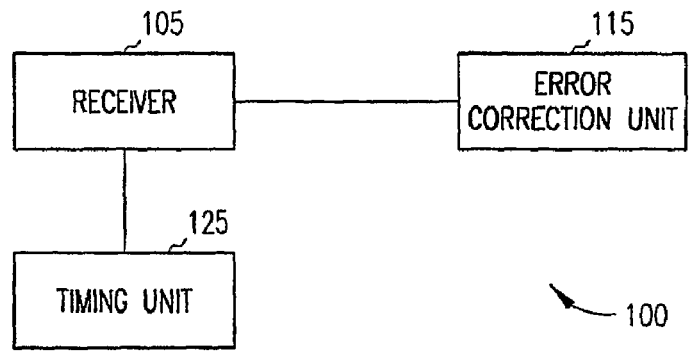
FIG. 1 shows a block diagram of an embodiment of an apparatus having a receiver configured to operate with an increased sampling rate to allow for requests to retransmit data in response to detecting errors in the data.

FIG. 1 shows a block diagram of an embodiment of an apparatus 100 having a receiver 105 configured to operate with an increased sampling rate to allow for generating requests to retransmit data in response to detecting errors in the data. Apparatus 100 includes an error correction unit 115 and a timing unit 125. Error correction unit 115 determines that errors exist in the data decoded from a signal acquired by receiver 105. Error correction unit 115 may initiate a request to be sent to the transmitting node or transmitting unit to transmit the data found to have errors. Automatic repeat request (ARQ) techniques may be used to implement data retransmission.

Timing unit 125 provides time synchronizing functions that are implemented in standard protocols for communication systems. Timing unit 125 controls the setting of the sampling rate for apparatus 100. It may interact with a transmitting unit in the network to set the sampling rate. In an embodiment, timing unit 125 may be used to increase the sampling rate for the communication channel. Timing unit 125 may set the receiver 105 to the increased sampling rate determined by the transmitting unit and provide a confirmation or agreement to the sampling rate, acting as a slave in a master-slave arrangement. Such an agreement may be provided by operating at the sampling rate set by the transmitting node. Alternatively, timing unit 125 may set an increased sampling rate along with the transmitting node setting an increased sampling rate, in a master-master arrangement. A master-master arrangement assumes that two parts are equal in their rights to operate at various levels and conditions. Thus, timing unit 125 defines an increased sampling rate and the transmitting node defines an increased sampling rate. Communication between the two entities provides for the average increased sampling rate to be used as the increased operating rate. In an embodiment, the increased data rate is set up during initialization, when receiver 105 connects to a network.

Figure 2:
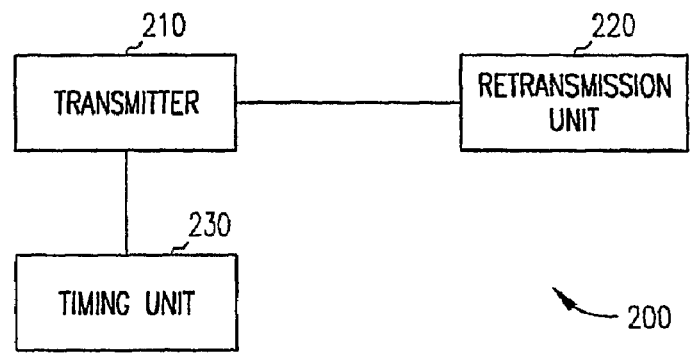
FIG. 2 shows a block diagram of an embodiment of an apparatus having a transmitter configured to operate with an increased sampling rate to retransmit data in response to a request for data retransmission.

FIG. 2 shows a block diagram of an embodiment of an apparatus 200 having a transmitter 210 configured to operate with an increased sampling rate to allow for requests to retransmit data in response to detecting errors in the data. Apparatus 200 includes a retransmission unit 220 and a timing unit 230. Retransmission unit 220 accepts requests to retransmit data and initiates the data retransmission. Retransmission unit 220 may engage in data retransmission for error correction using ARQ techniques.

Timing unit 230 provides time synchronizing functions that are implemented in standard protocols for communication systems. Timing unit 230 controls the setting the sampling rate for apparatus 200. It may interact with a receiving unit in the network to set the sampling rate. In an embodiment, timing unit 230 may be used to increase the sampling rate for the communication channel. Timing unit 230 may set the transmitter 210 to the increased sampling rate acting as the master in a master-slave arrangement with a receiving node. Alternatively, timing unit 230 may operate in a master-master arrangement with a receiving node to increase the sampling rate of the communication channel. In an embodiment, the increased data rate is set up during initialization, when transmitter 210 connects to a network. In various embodiments, an apparatus may be constructed as the combination of apparatus 100 of FIG. 1 and apparatus 200 of FIG. 2.

Figure 3:
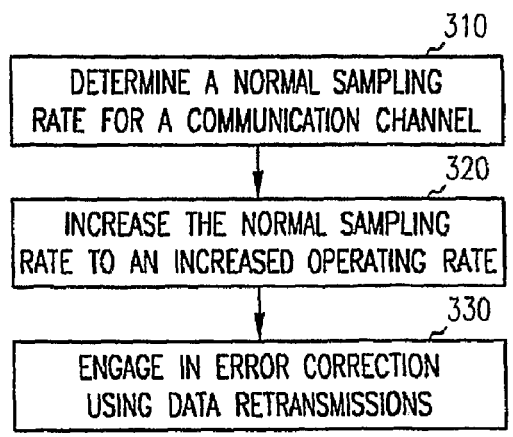
FIG. 3 illustrates a flow diagram of an embodiment of a method to allow data retransmissions to provide error correction.

FIG. 3 illustrates a flow diagram of an embodiment of a method to allow data retransmissions to provide error correction. At 310, a normal sampling rate for a communication channel is determined. A normal sampling rate is a sampling rate for a communication channel that is based on a requirement for channel parameter, such as a required signal-to-noise (SNR) ratio at a given bit error rate (BER) on a physical layer (PHY). In setting transmission requirements, a standard error correcting task is to provide errorless data transmission. In practice it is necessary to determine the SNR in the channel when the bit error rate is less than some predefined value, after conducting error correction techniques. During initialization of a transmitter or receiver connecting to a network, a time synchronization is conducted. The normal sampling rate for the transmitter and/or receiver is established during the initialization functions. In an embodiment, the normal sampling rate for the transmitter and/or receiver is known. In an embodiment, the normal sampling rate for the transmitter and/or receiver is preset in a transmitter and/or a receiver.

At 320, the normal sampling rate is increased to provide an increased operating rate. With the increased operating rate, channel capacity is reserved for use in the retransmission of erroneous packets resulting in lower bit-error rate. However, increasing the operating rate to allow retransmissions may also lead to increasing the number of erroneous packets with the frequency increase leading to more signal distortion in the communication channel. As a result, there is a trade-off between having the ability to retransmit more packets and having a larger number of erroneous packets. With a larger reservation of channel capacity for retransmission purposes, more erroneous packets may be retransmitted increasing the number of erroneous packets appearing on the receiver side of the communication channel. In an alternative approach using a higher code rate, codes with a higher rate usually have worse error correcting ability, which leads to increasing the number of erroneous packets, which also requires a trade-off analysis.

In an embodiment, with a slight increase in the normal sampling rate for a communication channel, the channel environment is also slightly changed. However, a small increase in the data rate of the channel allows for some retransmissions, while maintaining the overall information rate unchanged. In an embodiment, the normal sampling rate is increased to an operating rate by about 1% or less. In an embodiment, the normal sampling rate is increased by about 0.5% to an operating rate that allows between five and ten retransmissions of the error blocks. For example, consider a 10 G Ethernet communication system in which the 10 G Ethernet is to operate with effective errorless transmission. A error correcting code can be applied at the PHY that provides effective errorless transmission with a sampling rate of 800 MHz at a required SNR of 50 dB. With an increased operating rate of 802 MHz, more data may be transmitted. By increasing the sampling rate, the transmission properties of the channel deteriorate. However, the deterioration is not large, allowing the ability to transmit one to two additional frames. With two additional information frames, one can retransmit two worst case frames without degradation of the average transmission speed. It is not possible to increase the sampling rate infinitely, since a significant change in sampling rate results in significant changes in the communication channel such that the code stops error correction.

There is no analytical expression to calculate the sampling rate increase value to achieve best performance. Various numerical optimization methods may be applied. In experiments, the best results of the experiments have corresponded to the normal sampling rate being increased by about 0.5%. Significantly larger sampling rate increases are not anticipated, since significantly increasing the sampling rate alters the environment for communication in the channel, which may result in performance reduction of forward error correction (FEC) codes. Simulations of a 10 G communication channel indicate a 0.3 dB gain using an increased operating rate.

The determination of the normal sampling frequency and the incrementing of the normal sampling frequency may be performed as one operation. Such an operation may be performed as an apparatus, configured in a transmitter mode and/or a receiver mode, is connected to a network. The increased operating rate may be set with a transmitter at one node and a receiver at another node interacting during synchronizing functions to establish communication between the two nodes. As is known by those skilled in the art, synchronization and setting the normal sampling frequency is typically conducted as part of an initialization in the startup process upon connecting the transmitting node and/or receiving node to the network. The interaction to increase the normal sampling rate may be conducted in a master-slave arrangement or in a master-master arrangement. A master-slave synchronization may be part of a startup operation, where one part is the master (for example, the transmitter) that defines the timing. The second part is the slave (for example, the receiver) that adapts itself to the time and frequency that was defined by the master, where the common time is the time of the master. When the transmitter unit initiates the increased sampling rate and the receiver unit agrees with the transmitter, a master-slave synchronization process is used. When both the transmitting and the receiving units increase the sampling rate during synchronization, a master-master synchronization is used. A master-master operation supposes that two parts are equal in their rights, where each part defines its time characteristics. Then, the two parts calculate an average time between the two time determinations and use this average time during transmission. Other statistical measures may be used to adjust for the difference in time calculations and define time parameters associated with data transmission. The increased data rate may be set during initialization, when the transmitter and/or the receiver connect to the network At 330, error correction is realized using data retransmissions. The data retransmissions may be conducted with a receiver requesting retransmissions using ARQ techniques and the transmitter confirming the request and retransmitting the data. The ARQ techniques may be implemented at the data link level. The ARQ techniques may be implemented in the MAC. In a 10 G Ethernet model, the usage of ARQ with increased sampling rate makes it possible to achieve a lower bit-error value at the same SNR or a lower SNR that provides the same bit-error value. Alternately, codes of higher rate may be used maintaining the normal sampling rate. Various embodiments may be implemented in 10 G Ethernet projects, including using low density parity-check (LDPC) coded modulation, and in future IEEE 802.3.an physical and data link layer specifications.

Figure 4:
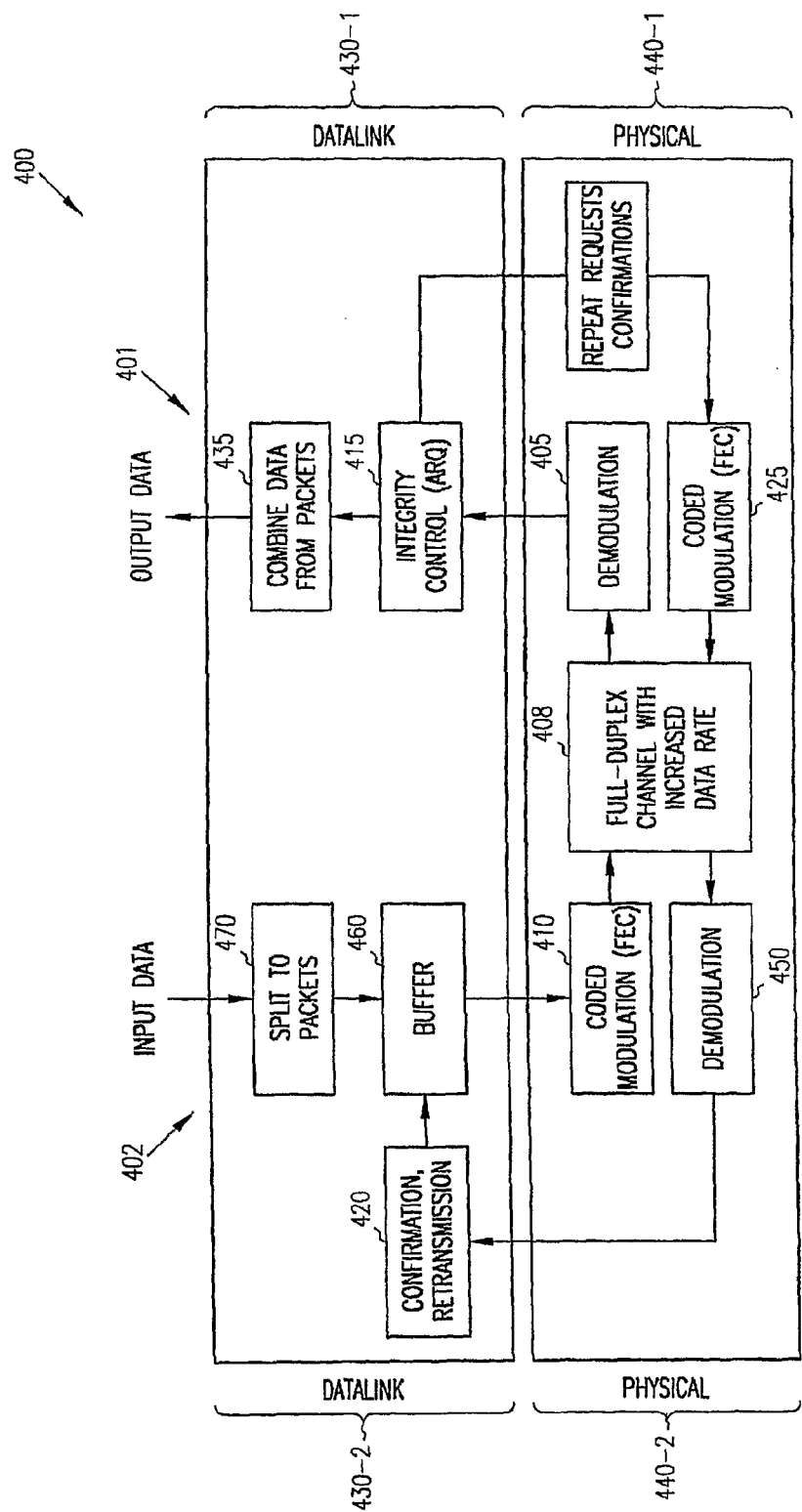
FIG. 4 illustrates an embodiment of a structure of a communication system in which a transmitting node and a receiving node operate at an increased sampling rate to allow data retransmission to correct errors in data transmission.

FIG. 4 illustrates an embodiment of a structure of a communication system 400 in which a receiving node 401 and a transmitting node 402 operate at an increased sampling rate for communication channel 408 to allow data retransmission to correct errors in data transmission. Node 402 includes a coded modulation unit 410, a confirmation/retransmission unit 420, a demodulation unit 450, a buffer 460, and a unit to split data into packets 470. Node 401 includes a demodulation unit 405, an integrity control 415, a coded modulation unit 425, and a unit to combine data from packets 435. Data link layer 430-1 is the data link layer of communication network 400 relative to node 401, while data link layer 430-2 is the data link layer of communication network 400 relative to node 402. Similarly, physical layer 440-1 is the physical layer of communication network 400 relative to node 401, while physical layer 440-2 is the physical layer of communication network 400 relative to node 402.

Communication channel 408 couples node 401 and node 402 to provide a medium for propagating information between nodes 401 and 402. In an embodiment, communication channel 408 may be a full-duplex channel with an increased data rate relative to a normal sampling rate for communication channel 408. Communication channel 408 may include, but is not limited to, a fiber optic channel, a wired channel, a channel for reading data stored on a memory unit, or a wireless channel.

Due to the increased operating rate for communication channel 408, integrity control 415 of node 401 may request retransmission of data that is determined to contain errors. The request for retransmission is sent to node 402 where confirmation/retransmission unit 420 initiates data retransmission. In an embodiment, nodes 401 and 402 engage in error correction using ARQ techniques. FIG. 4 represents an embodiment of a general transmission schema using ARQ. Other schemes may be implemented that take advantage of embodiments in which the sampling rate is increased to allow for data retransmission.

Various embodiments for communication network 400, node 401, and node 402 may be realized. Communication network 400 may be a land based network using optical fibers, coaxial cable, or a wires as a medium for the communication channels between various nodes of communication network 400. Each node of communication network 400 configured as a land based network or as a wireless based network may contain a version of node 402 and/or a version of node 401 or a node that is a combination of node 402 and node 401. Communication network 400 may be realized as a wireless network in which nodes 402 and 401 are configured as nodes of communication network 400 or as part of a wireless receiving device that receives signals from the stationary nodes of communication network 400. Node 401 and node 402 may be configured as systems that are part of, but not limited to, network components such as a stationary wireless devices and base stations and may be configured as part of, but not limited to, wireless receiving devices such as portable wireless devices, handheld communication devices, computers, and laptop computing devices.

Various embodiments or combination of embodiments for apparatus and methods for increasing the normal sampling rate for a communication network to engage in error corrections using data retransmissions, as described herein, can be realized in hardware implementations, software implementations, and combinations of hardware and software implementations. Various embodiments for engaging in error corrections using data retransmissions may include using automatic repeat request techniques. These implementations may include a computer-readable medium having computer-executable instructions for performing an embodiment of a method that includes increasing the normal sampling rate for a communication channel and engaging in error correction using data retransmissions. The computer-readable medium is not limited to any one type of medium, but may depend on the application using a particular embodiment. In an embodiment, a processor coupled to a receiver and/or transmitter may utilize various forms of memory to which it is coupled and the computer-readable medium to direct the increase of the normal sampling rate for a communication network to engage in error corrections using data retransmissions. In an embodiment, the memory may store parameters used in the various embodiments as discussed herein.

Figure 5:
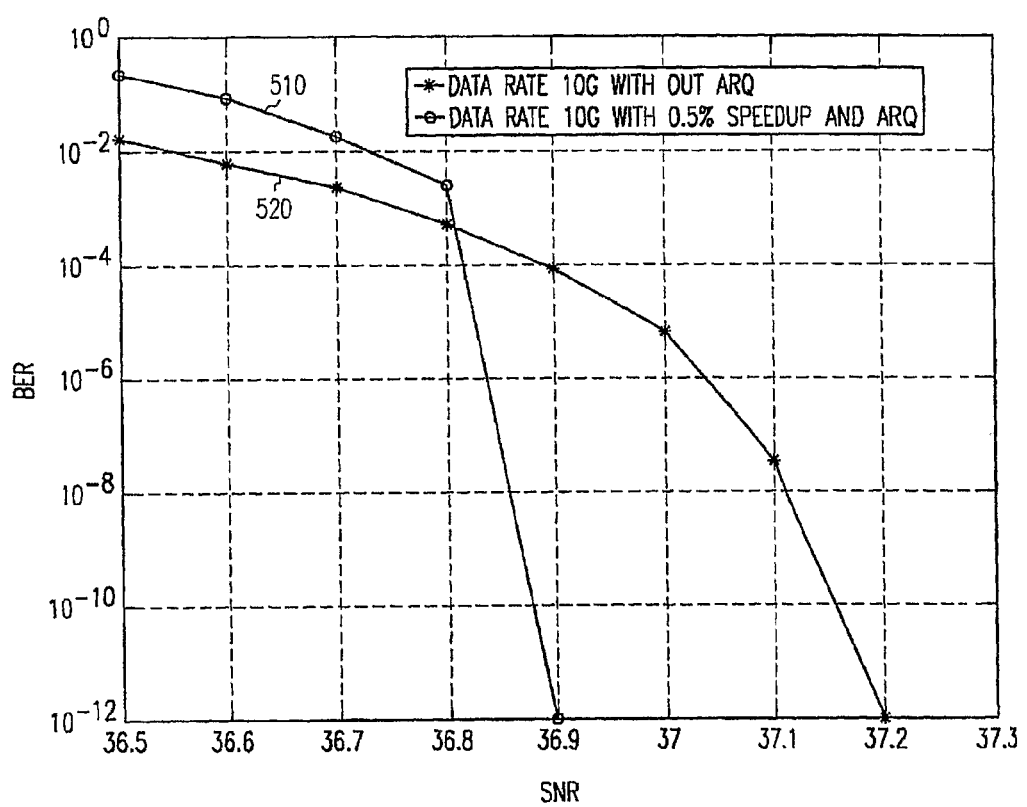
FIG. 5 demonstrates an example of a performance of an embodiment using an automatic repeat request at an increased sampling rate with respect to using an automatic repeat request at a normal sampling rate.

FIG. 5 demonstrates an example of a performance of an embodiment using ARQ at an increased sampling rate 510 with respect to using ARQ at a normal sampling rate 520. The results depicted in FIG. 5 are for a simulation of a 10 G Ethernet channel that compares operating at a normal sampling rate and operating at an increased sampling rate using ARQ with the same modulation scheme. The sampling rate was increased by 0.5%, while maintaining the data rate of the 10 G channel. The simulation showed a 0.3 dB gain when using ARQ at the increased sampling rate. Various embodiments may be used with a variety of codes and modulation schemes and may be applied to future codes and modulation schemes.

Figure 6:
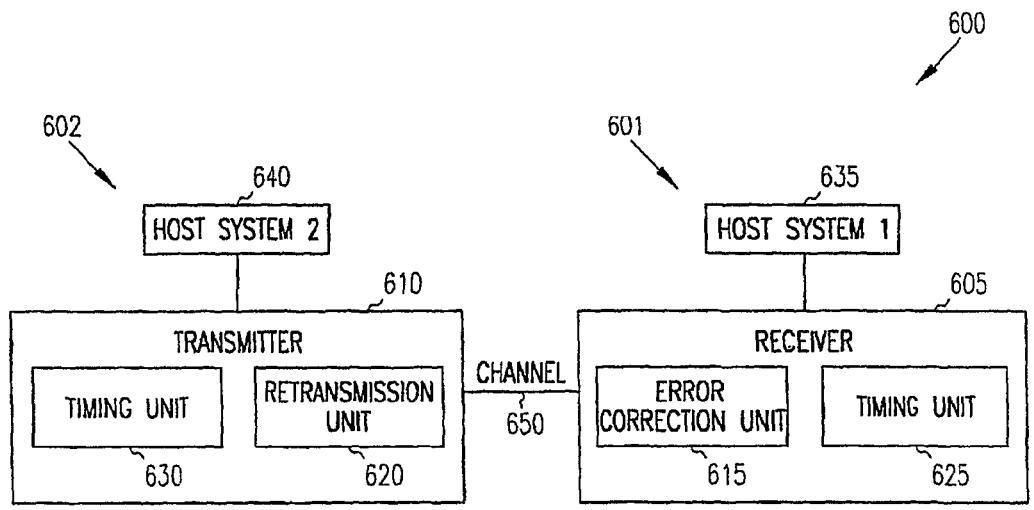
FIG. 6 illustrates a block diagram of an embodiment of a communication network having a system configured to retransmit information in response to a request for retransmission from another system due to error detection in data transmitted over a communication channel operating at an increased sampling rate.

FIG. 6 illustrates a block diagram of an embodiment of a communication network 600 having a node 602 configured to retransmit information in response to a request for retransmission from another node 601 due to error detection in data transmitted over a communication channel 650 operating at an increased sampling rate. Communication network 600 may include network node 601, having an error correction unit 615 to request retransmission of data determined to contain errors, and network node 602, having a retransmission unit 620 to retransmit the data in response to the request from network node 601.

Network node 601 may include a host system 635 communicatively coupled to a receiver 605. A host system may provide one or more functions at a node. A host system may direct operations of other systems and/or apparatus at the node. Host system 635 may include an external connection that is wired or wireless, as part of the communicative coupling to receiver 605. Host system 635 may be an external system to receiver 605 and may include one or more elements such as a switch, a router, a computer, or a server. Host system 635 may be communicatively coupled to receiver 605 over a bus that is compatible with Peripheral Component Interconnect (PCI) or with PCI express. Receiver 605 receives signals carrying data from channel 650. The data may be decoded into appropriate codewords to provide information to host system 635. If decoding does not provide errorless data as determined by error correction unit 615, a request to retransmit the data may be sent to network node 602. The retransmission request may be implemented using ARQ techniques. In an embodiment, error correction unit 615 operates at the data link layer. Receiver 605 includes a timing unit to increase the normal sampling rate of communication channel 650 to an increased operating rate that provides for data retransmission. Error correction unit 615 and timing unit 625 may be configured as part of receiver 605 or external to receiver 605.

Network node 602 may include a host system 640 communicatively coupled to a transmitter 610. Host system 640 may include an external connection that is wired or wireless, as part of the communicative coupling to transmitter 610. Host system 640 may be an external system to transmitter 610 and may include one or more elements such as a switch, a router, a computer, or a server. Host system 640 may be communicatively coupled to transmitter 610 over a bus that is compatible with PCI or with PCI express. Transmitter 610 includes retransmission unit 620 to retransmit data in response to a retransmission request from node 601. The retransmission request may be implemented using ARQ techniques. In an embodiment, retransmission unit 620 operates at the data link layer. Receiver 605 includes a timing unit 630 to increase the normal sampling rate of communication channel 650 to an increased operating rate that provides for data retransmission. Retransmission unit 620 and timing unit 620 may be configured as part of transmitter 610 or external to transmitter 610.

Network node 601 using timing unit 625 interacts with network node 602 using timing unit 630 to set the sampling rate for communication channel at an operating increased above the normal sampling rate for communication channel 650. The interaction to set the increased operating rate may be conducted in a master-slave arrangement, a master-master arrangement, or other arrangement according to the particular architecture of communication network 600.

The network nodes 601, 602 each may represent processing systems having a physical layer (PHY) entity arranged to operate in accordance with 10 GBase-T as defined by the IEEE 802.3an series of standards, for example. The 10 GBase-T PHY may interface with, for example, a 10 G media access control (MAC) and Gigabit Media Independent Interface (XGMII) in the IEEE architecture. The 10 GBase-T PHY may include part of a network interface card (NIC), for example. Nodes 601, 602 may include any processing system and/or communications device suitable for use with a 10 GBase-T device. For example, nodes 601, 602 may be implemented as a pair of switches, a pair of routers, a pair of servers, a switch and a router, a switch and a server, a server and a router, and so forth. In addition, nodes 601, 602 also may be part of a modular system in which 10 GBase-T is the high-speed connection for the system. In an embodiment, network nodes 601, 602 may be arranged such that host system 635 and host system 640 are configured as a single host system. Further examples for nodes 601, 602 may include high-end servers, supercomputers, clusters, grid computing, workgroup switch uplinks, aggregation uplinks, storage systems, and so forth. The embodiments are not limited in this context.

Figure 7:
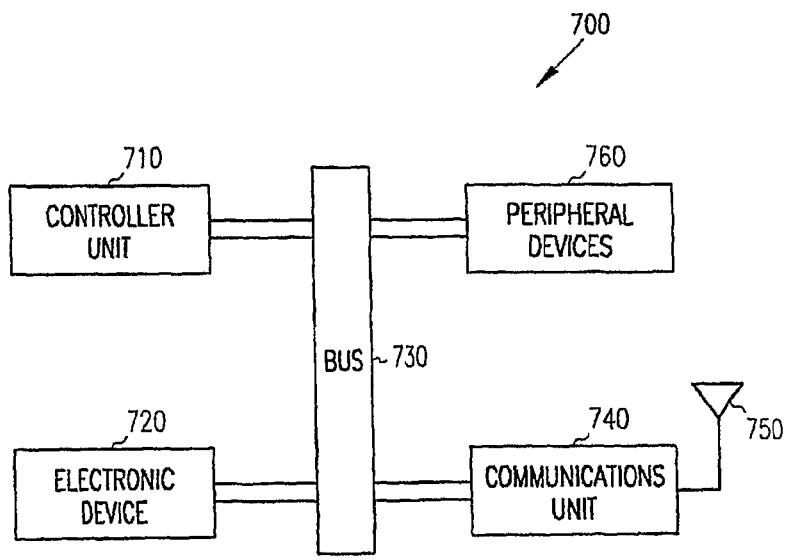
FIG. 7 illustrates a block diagram of an embodiment of a system configured to operate at a sampling rate increased from a normal sampling rate of a communication channel to allow for data retransmissions due to detected errors.

FIG. 7 illustrates a block diagram of an embodiment of a system 700 configured to operate at a sampling rate increased from a normal sampling rate of a communication channel to allow for data retransmissions due to detected errors. System 700 includes a controller 710, an electronic device 720, and a bus 730, where bus 730 provides electrical connectivity between controller 710 and electronic device 720, and between controller 710 and communication unit 740. An embodiment may include an additional peripheral device or devices 760 coupled to bus 730. Bus 730 may be compatible with PCI or with PCI express. In an embodiment, communication unit 740 may include a network interface card. In an embodiment, communication unit 740 may a communications device suitable for use with a 10 GBase-T device. In a wireless embodiment, communication unit 740 is coupled to an antenna 750. In an embodiment, antenna 750 may be a substantially omnidirectional antenna. Electronic system 700 may include, but is not limited to, information handling devices, wireless systems, telecommunication systems, fiber optic systems, electro-optic systems, and computers.

In an embodiment, controller 710 is a processor. In an embodiment, electronic device 720 is a transceiver that allows system 700 to communicate with other systems. Transceiver 720 may be realized as an appropriately modified combination of apparatus 100 and 200 of FIGS. 1 and 2, respectively. Transceiver is configured to interact with another system to increase the normal sampling for the communication channel through which system 700 and another system communicate. System 700 may engage in data correction with the other system using ARQ techniques through the communication channel operating at the increased sampling rate in accordance with an embodiment similar to the embodiments described herein. Peripheral devices 760 may include memory that stores computer executable instructions to set the normal sampling rate to an increased operating rate and to engage in error correction using ARQ techniques. Peripheral devices 760 may also include displays, additional storage memory, or other control devices that may operate in conjunction with controller 710. Alternatively, peripheral devices 760 may include displays, additional storage memory, or other control devices that may operate in conjunction with controller 710, communication unit 740, and/or electronic device 720.

Embodiments for increasing the normal sampling rate of a communication channel may be adapted to be used in any system operating with a communication channel. The communication channel may be part of a land based communication network or a wireless communication network. Indeed, embodiments may well be implemented as part of any wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and similar communication systems.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon reviewing the above description. The scope of the present invention includes any other applications in which embodiment of the above structures and fabrication methods are used. The scope of the embodiments of the present invention should be determined with reference to the appended claims, along with the full scope of equivalents to which such claims are entitled.

What is claimed is:

1. A method comprising:
   increasing, in a transmitting unit, a normal operating rate for a communication channel to an increased operating rate, allowing for retransmissions while maintaining an overall data rate of information unchanged; and
   retransmitting data to a receiving unit in response to receiving a request from the receiving unit to retransmit the data to provide error correction, wherein data transmission from the transmitting into the communication channel to the receiving unit is conducted at the increased operating rate.

2. The method of claim 1, wherein increasing the normal operating rate for the communication channel includes increasing the normal operating rate for the communication channel as part of a time synchronizing function.

3. The method of claim 1, wherein increasing the normal operating rate includes increasing the normal operating rate by about 1% or less.

4. The method of claim 1, wherein increasing the normal operating rate includes increasing the normal operating rate such that a required signal-to-noise ratio for the communication channel decreases for a given bit error rate of the communication channel relative to the communication channel operating at the normal operating rate.

5. The method of claim 1, wherein increasing the normal operating rate includes increasing the normal operating rate such that a required bit error rate for the communication channel decreases for a given signal-to-noise ratio relative to the communication channel operating at the normal operating rate.

6. The method of claim 1, wherein the method further includes:
   increasing the normal operating rate for the communication channel to the increased operating rate in the receiving unit; and
   generating the request in the receiving unit to retransmit the data from the transmitting unit to provide the error correction.

7. A method comprising:
   increasing, in a receiving unit, a normal operating rate for a communication channel to an increased operating rate, allowing for retransmissions while maintaining an overall data rate of information unchanged; and
   requesting a retransmission of data from a transmitting unit to provide error correction, wherein data transmission received in the receiving unit from the communication channel from the transmitting unit is conducted at the increased operating rate.

8. The method of claim 7, wherein increasing the normal operating rate for a communication channel includes determining the normal operating rate for the communication channel as part of a time synchronizing function during an initialization when connecting to a network.

9. The method of claim 7, wherein increasing the normal operating rate includes increasing the normal operating rate by about 1% or less.

10. The method of claim 7, wherein increasing the normal operating rate includes increasing the normal operating rate by about 0.5%.

11. The method of claim 7, wherein interacting with the transmitting unit to increase the normal operating rate to an increased operating rate includes increasing the normal operating rate to the increased operating rate jointly with the transmitting unit.

12. The method of claim 7, wherein increasing the operating rate includes adaptively increasing the operating rate to increase an overall data rate while maintaining error correction using automatic repeat requests.

13. The method of claim 7, wherein requesting the retransmission of data includes requesting retransmission using automatic repeat request techniques.

14. An apparatus comprising:
   a receiver to receive a data signal from a communication channel from a transmitting unit;
   an error correction unit to request data retransmission if data from the data signal contains errors; and
   a timing unit to interact with the transmitting unit to set an operating rate at a rate increased from a normal operating rate of the communication channel to allow for retransmissions of the data while maintaining an overall data rate of information unchanged.

15. The apparatus of claim 14, wherein the receiver and the error correction unit are adapted to maintain a data rate of a 10 G Ethernet network.

16. The apparatus of claim 14, wherein the operating rate is at a rate higher than the normal operating rate by about 1% or less.

17. The apparatus of claim 14, wherein the error correction unit is adapted to implement automatic repeat request techniques to request data retransmission.

18. An apparatus comprising:
a transmitter to send a data signal in to a communication channel to a receiving unit;
a retransmission unit to initiate retransmission of data upon request from the receiving unit; and
a timing unit to interact with the receiving unit to set an operating rate at a rate increased from a normal operating rate of the communication channel to allow for retransmissions while maintaining an overall data rate of information unchanged.

19. The apparatus of claim 18, wherein the transmitter and the retransmission unit are adapted to maintain a data rate of a 10 G Ethernet network.

20. The apparatus of claim 18, wherein the operating rate is at a rate higher than the normal operating rate by about 1% or less.

21. The apparatus of claim 18, wherein the retransmission unit is adapted to transmit data in response to an automatic repeat request.

22. An apparatus comprising:
a receiver to receive a first data signal from a remote transmitting unit through a first communication channel;
an error correction unit to request data retransmission if data from the first data signal contains errors;
a first timing unit to interact with the remote transmitting unit to set a first operating rate at a rate increased from a first normal operating rate of the first communication channel to allow for retransmissions of the data from the first data signal while maintaining an overall data rate of information unchanged;
a transmitter to send a second data signal to a remote receiving unit through a second communication channel;
a retransmission unit to initiate data retransmission of the data from the second data signal from the transmitter upon request from the remote receiving unit; and
a second timing unit to interact with the remote receiving unit to set a second data rate at a rate increased from a second normal operating rate of the second communication channel to allow for retransmissions of the data from the second data signal while maintaining an overall data rate of information unchanged.

23. The apparatus of claim 22, wherein the first operating rate is at a rate higher than the first normal operating rate by about 1% or less.

24. The apparatus of claim 22, wherein the transmitter and the receiver are part of a common transceiver.

25. The apparatus of claim 22, wherein the first timing unit and the second timing unit are configured as a single timing unit.

26. A system comprising:
a receiver to receive data from a communication channel;
an error correction unit to request retransmission if the received data contains errors; and
a timing unit to interact with a transmitting unit to set an operating rate increased from a normal operating rate of the communication channel to allow for retransmissions of the received data while maintaining an overall data rate of information unchanged; and
a host system having an external wired connection to communicatively couple with the receiver.

27. The system of claim 26, wherein the operating rate is at a rate higher than the normal operating rate by about 1% or less.

28. The system of claim 26, wherein the error correction unit is adapted to operate in a medium access control layer.

29. The system of claim 26, wherein the receiver is adapted to connect to a network interface card.

30. The system of claim 26, wherein the system includes a network interface compliant with 10 GBase-T to communicatively couple the receiver to a communication network containing the communication channel.

31. The system of claim 26, wherein the host system includes one or more of a computer, a switch, a router, or a server.

32. The system of claim 26, wherein the system further includes a bus to communicatively couple the host system to the receiver.

33. The system of claim 32, wherein the bus is compatible with PCI or with PCI express.

34. A system comprising:
a transmitter to send data in to a communication channel;
a retransmission unit to retransmit the data;
a timing unit to interact with a receiving unit to determine a normal operating rate of the communication channel as part of a time synchronizing function and to set an operating rate increased from the normal operating rate of the communication channel to allow for retransmissions of the data while maintaining an overall data rate of information unchanged; and
a host system having an external wired connection to communicatively couple to the transmitter.

35. The system of claim 34, wherein the operating rate includes an operating rate at rate higher than the normal operating rate by about 1% or less.

36. The system of claim 34, wherein the transmitter is adapted to connect to a network interface card.

37. The system of claim 34, wherein the system includes a network interface compliant with 10 GBase-T to communicatively couple the transmitter to a communication network containing the communication channel.

38. The system of claim 34, wherein the host system includes one or more of a computer, a switch, a router, or a server.

39. The system of claim 34, further including a bus to communicatively couple the host system to the transmitter, wherein the bus is compatible with PCI or with PCI express.

* * * * *